(12) United States Patent
Nakano et al.

(10) Patent No.: US 7,401,978 B2
(45) Date of Patent: Jul. 22, 2008

(54) LINEAR MOTION GUIDING APPARATUS

(75) Inventors: Kenta Nakano, Maebashi (JP); Ryoichi Sato, Maebashi (JP); Hiroki Yamaguchi, Hanyu (JP)

(73) Assignees: NSK Ltd., Tokyo (JP); NSK Precision Co., Ltd., Tokyo (JP)

( * ) Notice: Subject to any disclaimer, the term of this patent is extended or adjusted under 35 U.S.C. 154(b) by 236 days.

(21) Appl. No.: 10/555,582

(22) PCT Filed: Aug. 24, 2004

(86) PCT No.: PCT/JP2004/012108

§ 371 (c)(1),
(2), (4) Date: Nov. 4, 2005

(87) PCT Pub. No.: WO2005/019668

PCT Pub. Date: Mar. 3, 2005

(65) Prior Publication Data

US 2007/0003172 A1     Jan. 4, 2007

(30) Foreign Application Priority Data

Aug. 25, 2003 (JP) .............................. 2003-300235

(51) Int. Cl.
*F16C 29/06* (2006.01)
(52) U.S. Cl. .......................................... 384/45; 384/43
(58) Field of Classification Search ............. 384/13–15, 384/43–45, 51, 902; 464/164
See application file for complete search history.

(56) References Cited

U.S. PATENT DOCUMENTS 4,844,624 A    7/1989   Teramachi 5,308,170 A    5/1994   Yamaguchi et al.

(Continued)

FOREIGN PATENT DOCUMENTS

JP     63-293319 A     11/1988

(Continued)

OTHER PUBLICATIONS

International Search Report, dated Dec. 21, 2004, including English Translation Two (2) pages.

*Primary Examiner*—Marcus Charles
(74) *Attorney, Agent, or Firm*—Crowell & Moring LLP.

(57) ABSTRACT

A linear guiding device where noise characteristics are improved by reducing traveling noise and operability of a slider body is smoothed, and where movement braking can be improved by reducing rolling body passage vibration. Crowning 24 with a curved surface having a predetermined curvature radius R is provided on an end section of a rolling body raceway groove 11 of a bearing block 24. A crowning amount C of the crowning 24 is set to a value $C > H_{max}$ greater that the value of a maximum elastic deformation amount $H_{max}$ of a rolling body B elastically deformed in a rolling body rolling path 14 by a preload or an external load. By this, even when a large load acts on a bearing block 2A or a large installation error occurs by skewing etc., the rolling body B smoothly rolls without an elastic deformation amount of the rolling body B rolling on the end section side of the rolling body raceway groove 11 becoming greater than the crowning amount C. As a consequence, significant worsening of a noise level and impairment of operability can be prevented.

8 Claims, 5 Drawing Sheets

U.S. PATENT DOCUMENTS

| | | | | |
|---|---|---|---|---|
| 5,445,455 | A | * | 8/1995 | Holweg .................... 384/45 |
| 5,728,990 | A | | 3/1998 | Kobayashi |
| 5,927,858 | A | * | 7/1999 | Agari ...................... 384/45 |
| 6,024,490 | A | * | 2/2000 | Shirai ...................... 384/13 |
| 6,517,245 | B2 | * | 2/2003 | Luo et al. ................ 384/45 |
| 6,663,285 | B2 | * | 12/2003 | Kasuga et al. ............ 384/45 |
| 2001/0008568 | A1 | | 7/2001 | Kasuga et al. |
| 2001/0012415 | A1 | * | 8/2001 | Kasuga et al. ............ 384/45 |
| 2002/0018602 | A1 | | 2/2002 | Kato et al. |
| 2002/0067869 | A1 | * | 6/2002 | Michioka et al. ......... 384/45 |
| 2003/0113044 | A1 | * | 6/2003 | Kasuga et al. ............ 384/45 |
| 2003/0118256 | A1 | | 6/2003 | Ishihara |
| 2004/0047525 | A1 | | 3/2004 | Kasuga et al. |

FOREIGN PATENT DOCUMENTS

| | | |
|---|---|---|
| JP | 04-054310 | 2/1992 |
| JP | 06-050333 A | 2/1994 |
| JP | 10-009262 A | 1/1998 |
| JP | 2001-193739 A | 7/2001 |
| JP | 2002-089557 A | 3/2002 |
| JP | 2003-194057 A | 7/2003 |

* cited by examiner

LINEAR MOTION GUIDING APPARATUS

TECHNICAL FIELD

The present invention concerns a linear motion guiding apparatus.

BACKGROUND ART

A linear motion guiding apparatus for linearly guiding an article to be guided while circulating rolling elements such as rollers or balls infinitely in the inside is one of important mechanical elements giving significant effects on the moving accuracy of semiconductor manufacturing apparatus, super precision fabrication machines, super precision measuring instruments, etc.

The linear motion guiding apparatus is an apparatus including a guide rail provided with a rail side rolling element raceway groove, and a slider main body in which a slider side rolling element raceway groove opposed to the rail side rolling element raceway groove is provided and supported on the guide rail so as to be moveable axially by way of rolling of a plurality polarity of rolling elements arranged in the rolling element rolling channel formed between the slider side rolling element raceway groove and the rail side rolling element raceway groove. Then, the apparatus includes a rolling element return channel formed in the slider main body so as to be substantially in parallel with the rolling element rolling channel, an end cap attached to both ends in the moving direction of the slider main body to form an outer circumferential circulation groove for a semi-arcuate rolling element circulation channel for communicating the end of the rolling element return channel and the end of the rolling element rolling channel, and a return guide interposed between the end cap and the slider main body to form an inner circumferential circulation groove for the rolling element circulation channel at a position opposed to the outer circumferential circulation groove.

In a case where rolling elements of the linear motion guiding apparatus circulate the rolling element rolling channel, the rolling element circulation channel, and the rolling element return channel infinitely, periodical fine vibrations (hereinafter referred to as rolling element passing vibrations) are generated to greatly effectuate the moving accuracy of the equipments described above. The rolling element passing vibrations are developed when the rolling elements rolling in the rolling element rolling channel (load region) while undergoing load by pre-load or external load are released from the load upon exiting from the load region to the rolling element circulation channel (non-load region) or applied with additional load upon entrance from the non-load region to the load region.

Suppression for the rolling element passing vibrations is conducted by applying a crowing fabrication to both ends of the slider side rolling element raceway groove forming the rolling element rolling channel thereby gradually conducting change of load upon exit and entrance of the rolling element to and from the load region (for example, in Patent Document 1).

Patent Document 1: JP04-54310A (FIG. 11, FIG. 15).

However, the linear motion guiding apparatus described above involves a problem that the operability and the noise level are tended to be worsened in a case where a large load exerts on the slider main body or a large installation error is caused by caulking.

The present invention has been accomplished in view of the foregoing situations and it intends to provide a linear motion guiding apparatus capable of attaining the improvement in the noise characteristics by the reduction of the traveling sounds and attaining the smooth operability for the slider main body, as well as capable of improving the moving accuracy by the reduction of the rolling element passing vibrations.

DISCLOSURE OF THE INVENTION

As a result of the earnest study made by the present applicant on the noise characteristics and the operability of a linear motion guiding apparatus, the followings have been found.

That is, it has been found that worsening of the noise characteristics and the operability of the linear motion guiding apparatus has a correlation with the amount of crowning for a crowning formed on both ends of the slider side rolling element raceway groove of the slider main body and the elastic deformation amount of the rolling element. The crowing amount is an amount of escape of the slider side rolling element raceway groove at the contact position between a rolling element and a slider side rolling element raceway groove in the direction of the angle of contact.

Referring further to the correlation between the crowning amount and the elastic deformation amount of the rolling element, the crowning amount is defined in the existent apparatus about to 1.5% or less of a diameter of the rolling element in order to minimize the lowering of the load capacity or since it is based on the value of the pre-load amount and, when a large load exerts on the slider main body, or large attaching error is caused by caulking or the like, the elastic deformation amount of the rolling element on the end of the slider side rolling element raceway groove formed with the crowning exceeds the crowning amount and smooth rolling of the rolling element is hindered to increase noises. The noises occur more remarkably in a case of setting a gap between rows of rolling elements smaller or in a case of interposing a cage piece between the rolling elements to make the pitch between the rolling elements constant.

In view of the above, a linear motion guiding apparatus according to one embodiment of the present application, includes a guide rail in which a rail side rolling element raceway groove is provided to the lateral surface along an axial direction, a slider main body having a slider side rolling element raceway groove opposed to the railway side rolling element raceway groove and supported on the guide rail so as to be movable axially by way of a plurality of rolling elements arranged in a rolling element rolling channel formed between the rail side rolling element raceway groove and the slider side rolling element raceway groove, a rolling element return channel provided in the slider main body so as to be substantially parallel with the rolling element rolling channel, an end cap attached to both ends of the slider main body in the moving direction and forming a semicircular outer circumferential circulation groove of a rolling element circulation channel for communicating the end of the rolling element return channel and the end of the rolling element rolling channel, a return guide interposed between the end cap and the slider main body and forming an inner circumferential circulation groove of the rolling element circulation channel at a position opposed to the outer circumferential circulation groove, and a crowning disposed on both ends of the slider rolling element raceway groove, wherein the crowning amount of the crowning is set to a value larger than the maximum elastic deformation amount of the rolling element that rolls along the rolling element rolling channel.

Further, according to an additional embodiment of the invention, a linear motion guiding apparatus includes a guide rail in which a rail side rolling element raceway groove is provided to the lateral surface along with an axial direction, a slider main body having a slider side rolling element raceway groove opposed to the railway side rolling element raceway groove and supported on the guide rail so as to be movable axially by way of a plurality of rolling elements arranged in a rolling element rolling channel formed between the rail side rolling element raceway groove and the slider side rolling element raceway groove, a rolling element return channel provided in the slider main body so as to be substantially parallel with the rolling element rolling channel, an end cap attached to both ends of the slider main body in the moving direction, and forming a semi-arcuate outer circumferential circulation groove of rolling element circulation channel for communicating the end of the rolling element return channel and the end of the rolling element rolling channel, a return guide interposed between the end cap and the slider main body and forming an inner circumferential circulation groove of the rolling element circulation channel at a position opposed to the outer circumferential circulation groove, and a crowning disposed at both ends of the slider rolling element raceway groove, wherein the crowning amount of the crowning is set to a value of 1.5% or less of the diameter of the rolling element.

Further, according to a further embodiment of the invention, the crowning amount is defined as 0.3% or more of the diameter of the rolling element.

Further, according to yet a further embodiment of the invention, the crowning is formed into a curved shape bending at a predetermined radius of curvature and the radius of curvature is set to 70 times or more the diameter of the rolling element.

Further, according to a still further embodiment of the invention, a step elimination portion is provided between the end of the crowning and the groove end of the inner circumferential circulation groove of the return guide in contiguous with the end.

Further, according to yet a still further embodiment of the invention, a honing fabrication is applied at least to a boundary portion between the slider rolling element groove and the crowning

DESCRIPTION FOR REFERENCES 1 guide rail
2 slider
2A bearing block (slider main body)
2B end cap
10 rolling element raceway groove (rail side rolling element raceway groove)
11 rolling element raceway groove (slider side rolling element raceway groove)
13 rolling element return channel
14 rolling element rolling channel
16 outer circumference circulation groove
18 return guide
20 inner circumference circulation groove
22 rolling element circulation channel
24 crowning
26 chamfered portion (step elimination portion)
28 boundary portion between a rolling element rolling groove and crowning
B rolling element
C crowning amount

BEST MODE FOR PRACTICING THE INVENTION

Preferred embodiments of a linear motion guiding apparatus according to the present invention are to be described with reference to drawings.

Figure 1:
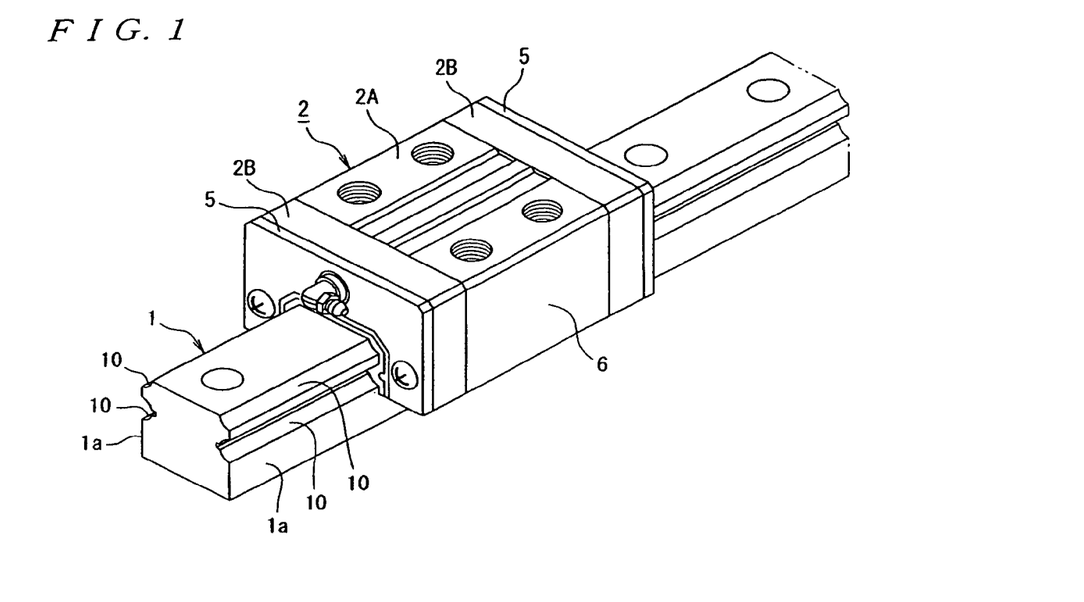
FIG. 1 is a perspective view showing a linear motion guiding apparatus according to the present invention.

FIG. 1 shows an appearance of a linear motion guiding apparatus. In the linear motion guiding apparatus, a gate-shaped slider 2 is assembled moveably over a guide rail 1. Along a ridge where the upper surface and the lateral surface 1a of the guide rail 1 cross to each other, a rolling element raceway groove 10 comprising a substantially quadrant concave groove extending in the axial direction is formed. Further, a rolling element raceway groove 20 comprising a substantially semicircular concave groove in a cross section and extending in the axial direction is formed also at an intermediate position of both on the lateral sides 1a of the guide rail 1.

The slider 2 comprises a bearing block 2A constituting a main body of the slider 2 and gate-shaped end caps 2B attached detachably on both axial ends thereof and, further, side seals 5 for sealing the openings of gaps between the guide rail 1 and the slider 2 are attached respectively to both ends (end faces for respective end caps 2B) of the slider 2.

Figure 2:
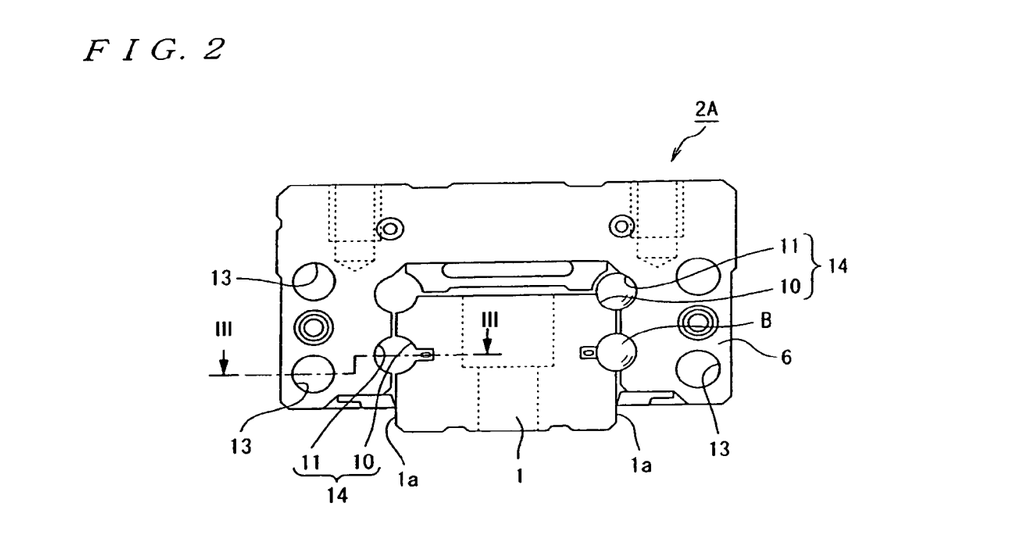
FIG. 2 is a plane view showing a bearing block as a constituent member of the liner motion guiding apparatus.

As shown in FIG. 2, a rolling element raceway groove 11 having a substantially semicircular cross section opposing to the rolling element raceway groove 10 of the guide rail 1 is formed at the corner on the inner lateral surface of both sleeves 6 of the bearing block 2A, while a rolling element raceway groove 11 of a substantially semicircular cross sectional shape opposing to the rolling element raceway groove 10 of the guide rail 1 is formed at the central portion on the inner lateral surface of the sleeve portions 6.

Then, the rolling element raceway grooves 10 of the guide rail 1 and the rolling element guide grooves 11 in both sleeve portions 6 of the bearing block 2A form rolling element rolling channels 14 at four positions, and the rolling element rolling channels extend in the axial direction. Further, the slider 2 has rolling element return channels 13 each comprising a circular through hole penetrating the upper portion and the lower portion of the thick-walled portion of the sleeves 6 of the bearing block 2A penetrating axially in parallel with the rolling element rolling channel 14.

Figure 3:
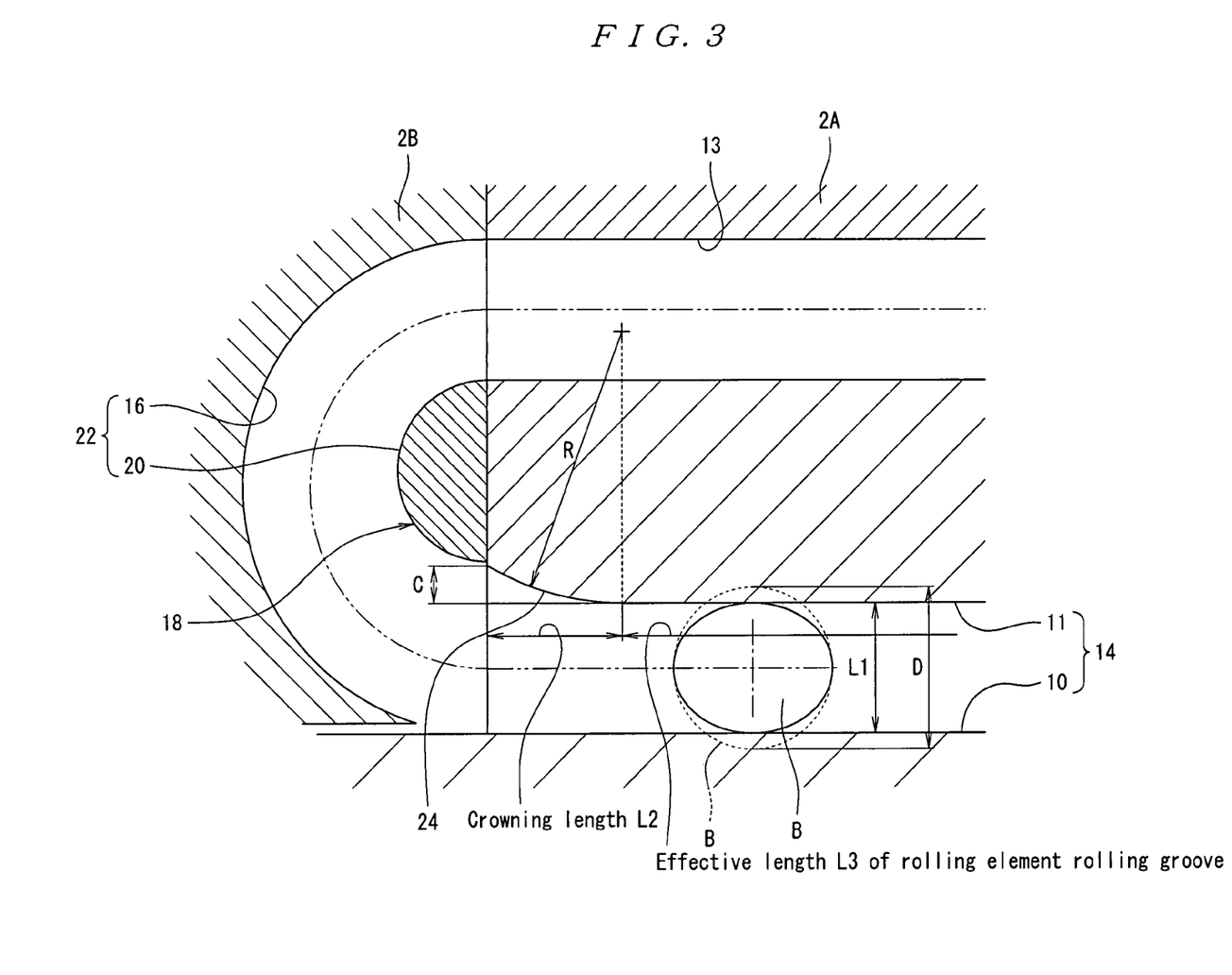
FIG. 3 is a view taken along arrow III-III in FIG. 2 showing a first embodiment according to the invention.

FIG. 3 shows a first embodiment according to the present invention.

As shown in FIG. 3, the end cap 2B is provided with a semicircular circumferential circulation groove 16 on the side of the abutting surface with the bearing block 2A. Further, a member depicted by a reference 18 in FIG. 3 is a return guide interposed between the bearing block 2A and the end cap 2B, and an inner circumferential circulation groove 20 is disposed to the outer circumference of the return guide 18 at a position corresponding to the outer circumferential circulation groove 16. The outer circumferential circulation groove 16 and the inner circumferential circulation groove 20 constitute a rolling element circulation channel 22 for communicating the rolling element rolling channel 14 with the rolling element return channel 13, in which the rolling element B rolling in the rolling element circulation channel 22 is sent from the end point of the rolling element rolling channel 14 to the start point of the rolling element return channel 13, or from the end point of the rolling element return channel 13 to the start point of the rolling element rolling channel 14.

Then, in this embodiment, as shown in FIG. 3, a crowning 24 formed into a curved surface with a predetermined radius of curvature R is disposed to the end of the rolling element raceway groove 11 of the bearing block 2A. The size depicted by a reference C for the crowning 24 is a crowning amount showing the amount of flank of the rolling element rolling raceway groove 21 at the position of contact between the rolling element B and the rolling element raceway track 11 in the direction of the angle of contact.

Further, the rolling element B represented by a solid line in the rolling element rolling channel 14 in FIG. 3 shows a state deformed elastically by a pre-load or external load. Assuming the diameter for the rolling element B (rolling element shown by a broken line) in a case where the deformation load is not applied and assuming the diameter as L1 when the rolling element B suffers from maximum elastic deformation as shown in the solid line, the maximum elastic deformation amount $H_{max}$ for the rolling element B is determined by the following equation:

$$H_{max} = L1 - D \qquad (1)$$

In this embodiment, since the crowning 24 is provided at the end of the rolling element raceway groove 11, load changes gradually in a case where the rolling element B that rolls in the rolling element rolling channel 14 (load region) while undergoing load by pre-load or external load is unloaded when it exits from the load region to the rolling element circulation channel 22 (non-load region) or is applied with an additional load when it enters from the non-load region to the load region, so that the moving accuracy can be improved due to reduction of rolling element passing vibrations, and remarkable worsening of noise level or worsening of operability can be prevented.

In this embodiment, since the crowning 24 is provided at the end of the rolling element raceway groove 11, load changes gradually in a case where the rolling element B that rolls in the rolling element rolling channel 14 (load region) while undergoing load by pre-load or external load is unloaded when it exits from the load region to the rolling element circulation channel 22 (non-load region) or is applied with an additional load when it enters from the non-load region to the load region, so that the motion braking can be improved due to reduction of rolling element passing vibrations, and remarkable worsening of noise level or worsening of operability can be prevented.

Then, the linear motion guiding apparatus may sometimes be used in a state where loads or moments from various directions exert in a composite manner or in a state where attaching error is present, and as an allowable value for the extent the composite load or the attaching error is generally into the applied load in the radial direction based on the running distance life (flaking life due to fatigue) and the allowable value in this case is defined as 20% or less of the rated dynamic load. In a case where a long life is required, the value is generally defined as 10% or less of the rated dynamic load. However, since the crowning amount of the existent crowning disposed to the slider main body of the linear motion guiding apparatus was defined as a value smaller than the maximum elastic deformation amount of the rolling element when an external force at 20% for the rated dynamic load exerts in the radial direction, it may possibly worsen the noise level or worsen the operability.

On the contrary, in this embodiment, since the crowning amount C of the crowning 24 is set to a value larger than the maximum elastic deformation amount $H_{max}$ for the rolling element B, even in a case where a large load exerts on the bearing block 2A or large attaching error is caused by caulking or the like, and the elastic deformation amount of the rolling element B that rolls on the end of the rolling element raceway groove 11 is not larger than the crowning amount C and the rolling element rolls smoothly, remarkable worsening of the noise level or worsening of the operability can be prevented.

Further, by using the linear motion guiding apparatus of this embodiment considering the compatibility between the noise characteristic and the durability, in a case where noises occur in the operation of a table body before operation, undesired effects on the durability such as significant reduction of the life by remarkable attaching error or applied loaded can be forecast, and it is possible to detect the occurrence of attaching error, etc. before full-scale operation.

Then, a second embodiment according to the present invention is to be described with reference to FIG. 3, FIG. 4, and FIG. 5 described above.

In this embodiment, the radius of curvature R of the crowning 24 was set to 1000 mm and the crowning amount C was set to 0.75% to the diameter D for the rolling element B.

Then, when a large attaching error (0.001 rad) was provided in the rolling direction to the bearing block 2A and the noise level was actually measured, it was found that while the increase for the value of the noise level was 12 dB (A) in the existent apparatus, it was lowered to 1 dB (A) in this embodiment when compared with a case of no attaching error.

Figure 4:
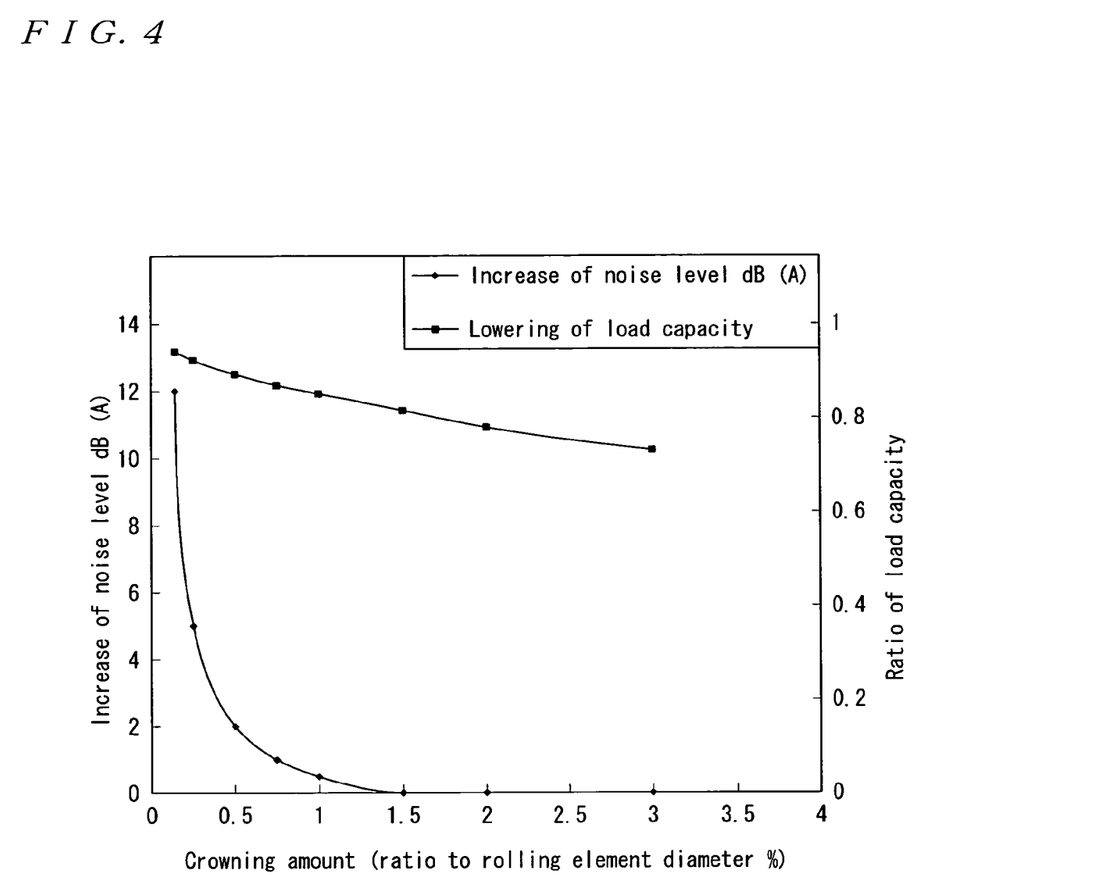
FIG. 4 is a graph for the result of an experiment measuring the change of the noise level and the change of the ratio of the load capacity while changing the amount of the crowning.

Further, FIG. 4 is a graph for the result of an experiment of providing an attaching error of 0.001 rad in the rolling direction to the bearing block 2A and measuring the ratio of the noise level and the load capacity while changing the crowning amount C of the crowning 24 (the ratio of the load capacity assuming the load capacity of the existent apparatus not provided with crowning as 1 and changing the crowning amount of the apparatus according to this embodiment relative to the existent apparatus).

In the graph shown in FIG. 4, the abscissa represents the ratio (%) of the crowning amount C relative to the diameter D for the rolling element B.

Generally, since the meaningful difference for the magnitude of sounds can be recognized also by human sensation, in a case where the noise level is 5 dB (A) or more, it is preferred that the crowning amount C is 0.3% or more relative to the diameter of the rolling element such that the noise level is less than 5 dB (A).

However, as a crowning amount C increases, the load capacity lowers with respect to a predetermined value as a boundary to lower the life of the linear motion guiding apparatus. That is, it can be seen that when the crowning amount C is made larger than a value of 1.5%, the load capacity reduces to less than 80% and the life of the linear motion guiding apparatus lowers abruptly. This is because the crowning length L2 is made longer when the crowning amount C is increased to a value larger than 1.5%, whereby the effective length L3 of the rolling element raceway groove 11 can not be ensured sufficiently and the number of rolling elements undergoing the load is decreased, so that the load capacity of the rolling element rolling channel 14 is less than 80% and the durability is deteriorated greatly as ½ or less compared with the existent apparatus. Accordingly, in view of the life of the linear motion guiding apparatus, when the crowning amount C is defined as 1.5% or less, it is possible to minimize the reduction of the load capacity and ensure the load capacity of 80% or more compared with the existent apparatus.

Accordingly, by setting the crowning amount C within a range from 0.3% to 1.5%, it is possible to provide a linear motion apparatus capable of improving the noise characteristics and minimizing the deterioration of the durability.

Figure 5:
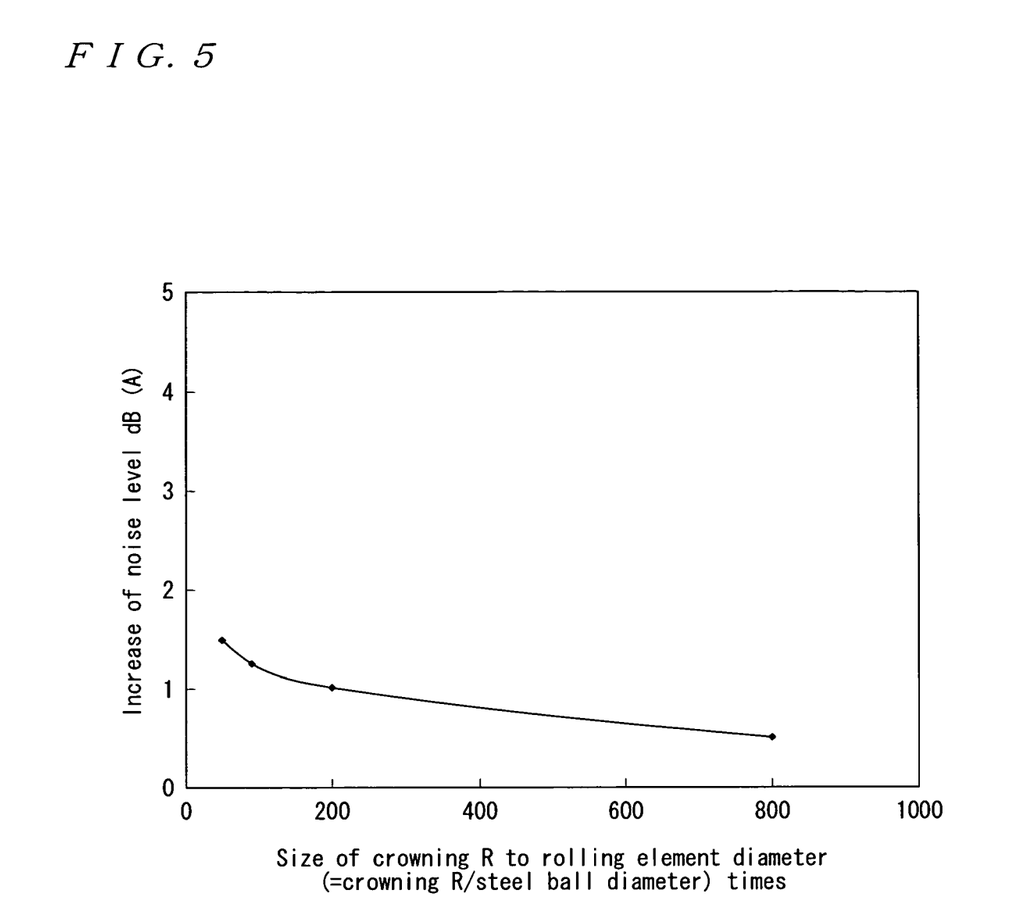
FIG. 5 is a graph for the result of experiment measuring the noise level while changing the radius of curvature of the crowning 24.

Further, FIG. 5 is a graph for the result of an experiment of providing a larger attaching error (0.001 rad) in the rolling direction to a bearing block 2A and measuring the noise level while setting the crowning amount C relative to the diameter of the rolling element B to 0.75% and changing the radius of curvature R for the crowning 24.

As apparent from the graph, the noise level is greatly decreased as the radius of curvature R of the crowning 24 is increased to 70 times or more the diameter D of the rolling element B. In this case, at a large radius of curvature R, since the effective length L3 for the rolling element raceway groove 11 can not be ensured sufficiently because the crowning length is made longer, it is preferred that the radius of curvature R for the crowning 24 is 800 times, the diameter D of the rolling element B as the upper limit.

Figure 6:
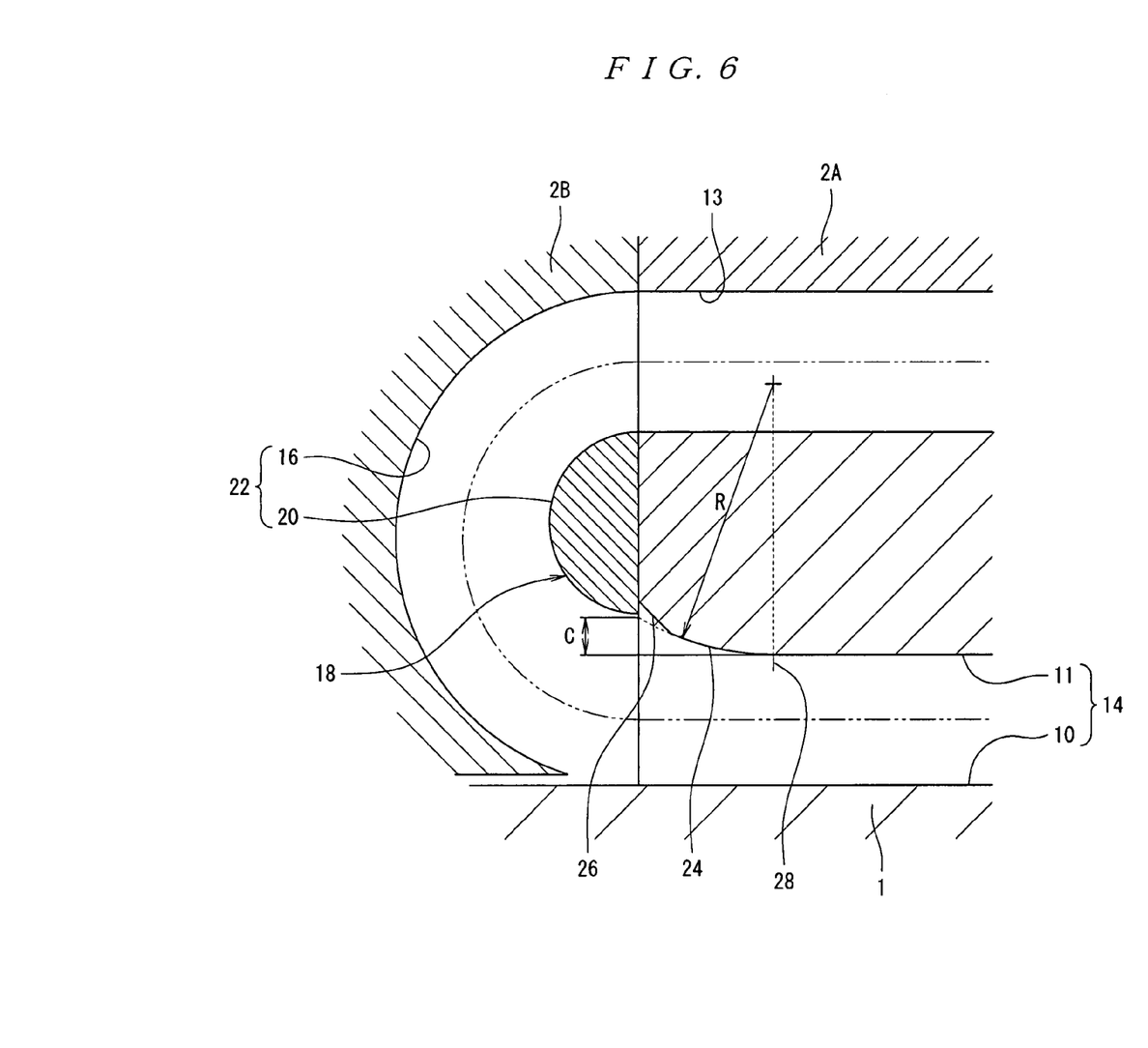
FIG. 6 is a view showing another embodiment according to the invention.

Then, FIG. 6 shows a third embodiment according to the invention.

In this embodiment, a chamfered portion 26 extending in a plane is formed to the end of a crowning 24, and a slight concavity is formed relative to the groove end of an inner circumferential circulation groove 20 of the return guide 18 in continuous with the end. The length of the chamfered portion 26 is set to less than the diameter for the rolling element B. Further, honing fabrication is applied to the boundary 28 between the rolling element raceway groove 11 and the crowning 24.

In this embodiment, since the chamfered portion 26 is formed at the end of the crowning 24, it is possible to eliminate a large step at the continuous portion between the crowning 24 and the inner circumferential circulation groove 20 of the return guide 18, absorb the positional displacement for the circulation parts (end cap, return guide) attached to the bearing end face, or prevent interference with other parts such as a steel ball (rolling element), and the rolling element B rolls smoothly between the rolling element rolling channel 14, the crowning 24, and the rolling element circulation channel 22. Further, since honing is applied to the boundary 28 between the rolling element raceway groove 11 and the crowning 24, the rolling element B rolls smoothly between the rolling element rolling channel 14 and the crowning 24. Accordingly, noise characteristics can be improved further.

The chamfered portion 26 described above is not limitative but it may a chamfered portion extending in a curved surface. Further, in addition to the chamfered portion 26, a crowning of another shape may be formed to the end of the crowning 24, or a portion to be fabricated simultaneously with the return guide may be provided.

Further, while the crowning 24 shown in the first to third embodiments has a shape of a curved surface curved at a predetermined radius of curvature R, the same effect can be obtained also by a crowning extending in a planar manner.

Further, while a structure of forming rolling element rolling channels 14 each at two positions between both sides of the guide rail 1 and both sleeves 6 of the bearing block 2A in FIG. 1 and FIG. 2, the same function and effect can be provided also by forming the rolling element rolling channel 14 each at one position.

Further, while the crowning amount C in the embodiment described above is flank amount of the rolling element rolling channel 11 at the contact position in the direction of the angle of contact between the rolling element B and the rolling element raceway groove 11, in a case where crowning fabrication is applied to the two rows of the rolling element rolling grooves 11 simultaneously for the sake of the fabrication for instance, the same effect can be obtained by converting the crowning amount C into the amount of change at the groove bottom of the rolling element rolling groove 11 and controlling the value thereof.

INDUSTRIAL APPLICABILITY

According to the linear motion guiding apparatus of the present invention, since a crowning larger than the maximum elastic deformation amount of the rolling element is provided to the end of the slider side rolling element raceway groove, load changes gradually in a case where the rolling element B that rolls in the rolling element rolling channel (load region) while undergoing load by pre-load or external load is unloaded when it exits from the load region to the rolling element circulation channel (non-load region) or is applied with an additional load when it enters from the non-load region to the load region, so that the moving accuracy can be improved due to reduction of rolling element passing vibrations, and remarkable worsening of noise level or worsening of operability can be prevented. Further, even in a case where a large load exerts on the slider main body or large attaching error occurs due to caulking or the like, since the crowning amount is set and the optimal crowning shape is defined, the rolling element rolls smoothly in the load region or non-load region, so that remarkable worsening of the noise level or worsening of the operability can be prevented while restricting the reduction of the load capacity.

The present invention is applicable to linear motion guiding apparatus for guiding an article to be guided linearly in semiconductor manufacturing apparatus, super precision fabrication machines, super precision measuring instruments, etc.

The invention claimed is:

1. A linear motion guiding apparatus including:
   a guide rail in which a rail side rolling element raceway groove is provided to the lateral surface along an axial direction,
   a slider main body having a slider side rolling element raceway groove opposed to the railway side rolling element raceway groove and supported on the guide rail so as to be movable axially by way of a plurality of rolling elements arranged in a rolling element rolling channel formed between the rail side rolling element raceway groove and the slider side rolling element raceway groove,
   a rolling element return channel provided in the slider main body so as to be substantially parallel with the rolling element rolling channel,
   an end cap attached to both ends of the slider main body in the moving direction and forming a semicircular outer circumferential circulation groove of a rolling element circulation channel for communicating the end of the rolling element return channel and the end of the rolling element rolling channel,
   a return guide interposed between the end cap and the slider main body and forming an inner circumferential circulation groove of the rolling element circulation channel at a position opposed to the outer circumferential circulation groove, and a crowning disposed on both ends of the slider rolling element raceway groove, wherein the crowning amount is defined as 0.3% to 1.5% of the diameter of a rolling element that rolls along the rolling element rolling channel.

2. A linear motion guiding apparatus according to claim 1, wherein the crowning is formed into a curved surface shape curved at a predetermined radius of curvature, and the radius of curvature is set to 70 times or more the diameter of the rolling element.

3. A linear motion guiding apparatus according to claim 2, wherein a step elimination portion is provided continuous with the end of the crowning and is located between the end of the crowning and the groove end of the inner circumferential circulation groove of the return guide.

4. A linear motion guiding apparatus according to claim 1, wherein a step elimination portion is provided continuous with the end of the crowning and is located between the end of the crowning and the groove end of the inner circumferential circulation groove of the return guide.

5. A linear motion guiding apparatus according to claim 1, wherein a boundary portion between the slider side rolling element groove and the crowning is fabricated at least by honing.

6. A linear motion guiding apparatus according to claim 1, wherein the crowning amount of the crowning is set to a value larger than the maximum elastic deformation amount of the rolling element that rolls along the rolling element rolling channel.

7. A linear motion guiding apparatus according to claim 6, wherein the crowning is formed into a curve having a predetermined radius of curvature and the radius of curvature is set to 70 times or more the diameter of the rolling element.

8. A linear motion guiding apparatus according to claim 6, wherein a step elimination portion is provided continuous with the end of the crowning and is located between the end of the crowning and the groove end of the inner circumferential circulation groove of the return guide.

* * * * *